(12) United States Patent
Coleman et al.

(10) Patent No.: US 11,178,104 B2
(45) Date of Patent: *Nov. 16, 2021

(54) NETWORK ISOLATION WITH CLOUD NETWORKS

(71) Applicant: L3 Technologies, Inc., New York, NY (US)

(72) Inventors: Glenn Coleman, Berwyn, PA (US); Peter Martz, Marlton, NJ (US); Kenneth Moritz, Lansdowne, PA (US)

(73) Assignee: L3 Technologies, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,378

(22) Filed: Sep. 25, 2018

(65) Prior Publication Data

US 2019/0097970 A1    Mar. 28, 2019

Related U.S. Application Data

(60) Provisional application No. 62/563,237, filed on Sep. 26, 2017.

(51) Int. Cl.
*H04L 29/06* (2006.01)
*G06F 21/53* (2013.01)
(Continued)

(52) U.S. Cl.
CPC ...... *H04L 63/0209* (2013.01); *G06F 9/45558* (2013.01); *G06F 21/53* (2013.01);
(Continued)

(58) Field of Classification Search
CPC ............ H04L 63/0209; H04L 63/0236; H04L 63/0281; H04L 63/029; H04L 63/145;
(Continued)

(56) References Cited

U.S. PATENT DOCUMENTS 7,150,040 B2   12/2006   Brownell
7,467,408 B1   12/2008   O'Toole, Jr.
(Continued)

FOREIGN PATENT DOCUMENTS

RU         2406138 C1    12/2010

OTHER PUBLICATIONS

Comodo (Comodo Internet Security Software Version 7.0 User Guide Version 7.0.111114, 579 pages, 2014) (Year: 2014).*

(Continued)

*Primary Examiner* — Oleg Korsak
(74) *Attorney, Agent, or Firm* — Condo Roccia Koptiw LLP (57) ABSTRACT

Systems and methods are disclosed for a sandbox based network isolation system configured to protect cloud based assets. A host computer system may include a processor and a memory. The host computer system may include a workspace. One or more applications may run in the workspace via a first memory space (e.g., a trusted memory space). The host computer system may include an isolated computing environment. One or more isolated applications may run in the isolated computing environment via a second memory space (e.g., an untrusted memory space). The isolated computing environment may be isolated from the workspace by an internal isolation firewall. The internal isolation firewall may prevent communication between the isolated computing environment and the workspace.

19 Claims, 4 Drawing Sheets

(51) Int. Cl.
*G06F 9/455* (2018.01)
*H04L 29/08* (2006.01)
(52) U.S. Cl.
CPC ........ *H04L 63/029* (2013.01); *H04L 63/0236* (2013.01); *H04L 63/0281* (2013.01); *H04L 63/145* (2013.01); *H04L 63/20* (2013.01); *H04L 67/10* (2013.01); *G06F 2009/45587* (2013.01); *G06F 2221/2149* (2013.01)
(58) Field of Classification Search
CPC ..... H04L 63/20; H04L 67/10; G06F 9/45558; G06F 21/53
See application file for complete search history.

(56) References Cited

U.S. PATENT DOCUMENTS

| | | | |
|---|---|---|---|
| 7,478,330 | B1 | 1/2009 | Branson et al. |
| 7,694,328 | B2 | 4/2010 | Joshi et al. |
| 7,698,442 | B1 | 4/2010 | Krishnamurthy et al. |
| 7,716,720 | B1 | 5/2010 | Marek et al. |
| 7,805,516 | B2 | 9/2010 | Kettler et al. |
| 7,870,153 | B2 | 1/2011 | Croft et al. |
| 7,926,086 | B1 | 4/2011 | Violleau et al. |
| 8,090,797 | B2 | 1/2012 | Chinta et al. |
| 8,539,561 | B2 | 9/2013 | Gupta et al. |
| 8,566,398 | B2 | 10/2013 | Barnier et al. |
| 8,613,070 | B1 | 12/2013 | Borzycki et al. |
| 8,769,268 | B2 | 7/2014 | Morozov et al. |
| 8,931,054 | B2 | 1/2015 | Huynh et al. |
| 8,966,464 | B1 | 2/2015 | Christopher et al. |
| 9,294,492 | B1 | 3/2016 | Martini et al. |
| 9,386,021 | B1 | 7/2016 | Pratt |
| 9,438,634 | B1 | 9/2016 | Ross et al. |
| 9,465,734 | B1 | 10/2016 | Myrick et al. |
| 9,531,715 | B1 | 12/2016 | Rodgers et al. |
| 9,602,524 | B2 | 3/2017 | Ghosh et al. |
| 9,609,026 | B2 | 3/2017 | Ross et al. |
| 9,680,873 | B1 | 6/2017 | Halls et al. |
| 9,729,579 | B1 | 8/2017 | Marino et al. |
| 9,787,639 | B1 | 10/2017 | Sun et al. |
| 9,864,600 | B2 | 1/2018 | Larimore et al. |
| 9,921,860 | B1 | 3/2018 | Banga et al. |
| 9,942,198 | B2 | 4/2018 | Hoy et al. |
| 10,037,199 | B2 | 7/2018 | Hung et al. |
| 10,055,231 | B1 | 8/2018 | Li et al. |
| 10,122,703 | B2 | 11/2018 | Innes et al. |
| 10,397,273 | B1 | 8/2019 | Stickle et al. |
| 10,521,612 | B2 | 12/2019 | Arad et al. |
| 10,931,669 | B2 | 2/2021 | Coleman et al. |
| 2002/0023212 | A1 | 2/2002 | Proudler |
| 2002/0040439 | A1 | 4/2002 | Kellum |
| 2002/0069366 | A1 | 6/2002 | Schoettger |
| 2002/0069369 | A1 | 6/2002 | Tremain et al. |
| 2005/0144467 | A1 | 6/2005 | Yamazaki |
| 2006/0070066 | A1 | 3/2006 | Grobman |
| 2006/0282795 | A1 | 12/2006 | Clark et al. |
| 2007/0136579 | A1 | 6/2007 | Levy et al. |
| 2007/0220187 | A1 | 9/2007 | Kates |
| 2007/0260873 | A1 | 11/2007 | Hatfalvi et al. |
| 2008/0016313 | A1 | 1/2008 | Murotake et al. |
| 2008/0028401 | A1 | 1/2008 | Geisinger |
| 2008/0201711 | A1 | 8/2008 | Amir Husain |
| 2008/0256536 | A1 | 10/2008 | Zhao et al. |
| 2009/0055924 | A1 | 2/2009 | Trotter |
| 2009/0164994 | A1 | 6/2009 | Vasilevsky et al. |
| 2009/0172781 | A1 | 7/2009 | Masuoka et al. |
| 2009/0249472 | A1 | 10/2009 | Litvin et al. |
| 2009/0265760 | A1 | 10/2009 | Zhu et al. |
| 2009/0328038 | A1 | 12/2009 | Yamada et al. |
| 2010/0138829 | A1 | 6/2010 | Hanquez et al. |
| 2010/0138830 | A1 | 6/2010 | Astete et al. |
| 2010/0223613 | A1 | 9/2010 | Schneider |
| 2010/0251329 | A1 | 9/2010 | Wei |
| 2011/0154431 | A1 | 6/2011 | Walsh |
| 2011/0299515 | A1 | 12/2011 | Robertson et al. |
| 2012/0017213 | A1 | 1/2012 | Hunt et al. |
| 2012/0023593 | A1 | 1/2012 | Puder et al. |
| 2012/0054744 | A1* | 3/2012 | Singh ............... G06F 9/45558 718/1 |
| 2012/0265976 | A1 | 10/2012 | Spiers et al. |
| 2013/0132948 | A1 | 5/2013 | Hari et al. |
| 2013/0145463 | A1 | 6/2013 | Ghosh et al. |
| 2013/0318594 | A1* | 11/2013 | Hoy ................. G06F 21/53 726/15 |
| 2014/0040979 | A1 | 2/2014 | Barton et al. |
| 2014/0059642 | A1 | 2/2014 | Deasy et al. |
| 2014/0075535 | A1 | 3/2014 | Softer et al. |
| 2014/0108558 | A1 | 4/2014 | Borzycki et al. |
| 2014/0115646 | A1 | 4/2014 | Rajgopal et al. |
| 2014/0282890 | A1 | 9/2014 | Li et al. |
| 2014/0344912 | A1 | 11/2014 | Chapman et al. |
| 2014/0351516 | A1 | 11/2014 | Larimore et al. |
| 2015/0156203 | A1* | 6/2015 | Giura ............... H04L 67/02 726/4 |
| 2015/0281176 | A1 | 10/2015 | Banfield |
| 2016/0057167 | A1 | 2/2016 | Bach |
| 2016/0134549 | A1 | 5/2016 | Abel et al. |
| 2016/0226834 | A1 | 8/2016 | Dawson |
| 2016/0246974 | A1 | 8/2016 | Broz et al. |
| 2016/0248754 | A1 | 8/2016 | Jahr |
| 2016/0292694 | A1 | 10/2016 | Goldschlag et al. |
| 2017/0034174 | A1* | 2/2017 | Jagers ............... H04L 63/0281 |
| 2017/0076092 | A1 | 3/2017 | Kashyap et al. |
| 2017/0142144 | A1 | 5/2017 | Weinberger et al. |
| 2017/0180413 | A1 | 6/2017 | Petry et al. |
| 2017/0206351 | A1 | 7/2017 | Jay et al. |
| 2017/0208067 | A1 | 7/2017 | Sriramakrishnan |
| 2017/0250997 | A1 | 8/2017 | Rostamabadi et al. |
| 2017/0317978 | A1 | 11/2017 | Diaz-Cuellar et al. |
| 2017/0353496 | A1 | 12/2017 | Pai et al. |
| 2017/0359309 | A1 | 12/2017 | Bolte et al. |
| 2018/0027006 | A1 | 1/2018 | Zimmermann et al. |
| 2018/0115519 | A1 | 4/2018 | Bonomi et al. |
| 2018/0139178 | A1 | 5/2018 | Gan |
| 2018/0196945 | A1 | 7/2018 | Kornegay et al. |
| 2018/0198824 | A1 | 7/2018 | Pulapaka et al. |
| 2018/0203995 | A1 | 7/2018 | Yuen et al. |
| 2018/0234422 | A1 | 8/2018 | Odom et al. |
| 2018/0276396 | A1 | 9/2018 | Yablokov et al. |
| 2018/0330257 | A1 | 11/2018 | Dodson et al. |
| 2018/0367528 | A1 | 12/2018 | Schwarz et al. |
| 2019/0097970 | A1 | 3/2019 | Coleman et al. |
| 2019/0097972 | A1 | 3/2019 | Coleman et al. |
| 2019/0098007 | A1 | 3/2019 | Coleman et al. |
| 2019/0098020 | A1 | 3/2019 | Martz et al. |
| 2019/0121961 | A1 | 4/2019 | Coleman et al. |
| 2019/0121962 | A1 | 4/2019 | Coleman et al. |
| 2019/0213325 | A1 | 7/2019 | McKerchar et al. |

OTHER PUBLICATIONS

Barnet, Mark, "Praktikum Po Zaschite Seti Kompanii", Windows IT Pro/RE, Nov.-Dec. 2006, pp. 79-81.
Burnett, Mark, "How I Secured One Company's Network", Using Log Parser, Virtualization, and a Little Psychology, Sep. 17, 2006, 4 pages.
Laverick, Mike, "Hypervisor Management and Optimization for Advanced Virtualization", E-book, TechTarget, 2010, 13 pages.
Li et al., "VSITE: A Scalable and Secure Architecture for Seamless L2 Enterprise Extension in the Cloud", 6th IEEE Workshop on Secure Network Protocols (NPSec), Oct. 2010, pp. 31-36.
Reuben, Jenni Susan, "A Survey on Virtual Machine Security", TKK T-110.5290 Seminar on Network Security, Oct. 11-12, 2007, 5 pages.
Villeneuve, Nart, "Command and Control in the Cloud", Malware Explorer, Oct. 22, 2010, 3 pages.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.

(56) References Cited

OTHER PUBLICATIONS

Wikipedia, "Cyber Security Standards", Available at https://en.wikipedia.org/wiki/Cyber_security_standards, retrieved on Dec. 2010, 9 pages.
Wikipedia, "HTTP Secure", Available at https://en.wikipedia.org/wiki/HTTPS, retrieved on Dec. 2010, 9 pages.
Wikipedia, "Hypervisor", Available at <https://en.wikipedia.org/wiki/Hypervisor>, retrieved on Dec. 2010, 6 pages.
Wikipedia, "Internet Protocol", Available at https://en.wikipedia.org/wiki/Internet_Protocol, Retrieved on Dec. 2010, 5 pages.
Wikipedia, "Multiprotocol Label Switching", Available at <https://en.wikipedia.org/wiki/Multiprotocol_Label_Switching>, retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused_operating_system, retrieved on Dec. 2010, 9 pages.
Wikipedia, "Virtual Desktop", Available at https://en.wikipedia.org/wiki/Virtual_desktop, Retrieved on Dec. 2010, 5 pages.
Wikipedia, "Virtual Private Network", Available at https://en.wikipedia.org/wiki/Virtual_private_network, retrieved on Dec. 2010, 9 pages.
"NPL Search Term", Web Search History, 1 page.
Azab et al., "SICE: A Hardware-Level Strongly Isolated Computing Environment for x86 Multi-Core Platforms", Proceedings of the 18th ACM Conference on Computerand Communications Security, Oct. 2011, pp. 375-388.
Bruckman et al., ""Georgia Computes!": Improving the Computing Education Pipeline", Proceeding of the 40th ACM Technical Symposium on Computer Science Education, 2009, pp. 86-90.
Gupta et al., "A Secure Architecture Design Based on Application Isolation, Code Minimization and Randomization", IEEE 6th Symposium on Security Analytics and Automation 2013, 2013, pp. 423-429.
Haq et al., "Design and Implementation of Sandbox Technique for Isolated Applications", IEEE School of Computer Science and Technology, Beijing Institute of Technology, Beijing, China, 2016, pp. 557-561.
Hsu et al., "Enforcing Least Privilege Memory Views for Multithreaded Applications", Proceedings of the 2016 ACM SIGSAC Conference on Computerand Communications Security, Oct. 2016, pp. 393-405.
Jauernig et al., "Trusted Execution Environments: Properties, Applications, and Challenges", IEEE Computer and Reliability Societies, Resilient Security, Mar.-Apr. 2020, pp. 56-60.
Jung et al., "An Architecture for Virtualization-Based Trusted Execution Environment on Mobile Devices", 2014 IEEE 11th International Conference on Ubiquitous Intelligence and Computing and 2014 IEEE 11th International Conference on Autonomic and Trusted Computing and 2014 IEEE 14th International Conference on Scalable Computing and Communications and, Associated Symposia/Workshops, 2014, pp. 540-547.
Kostiainen et al., "Dedicated Security Chips in the Age of Secure Enclaves", IEEE Computerand Reliability Societies; Hardware-Assisted Security, Sep.-Oct. 2020, pp. 38-46.
Le et al., "Computing the Real Isolated Points of an Algebraic Hypersurface", International Symposium on Symbolic and Algebraic Computation, Aug. 24, 2020, 12 pages.
Liu et al., "Thwarting Memory Disclosure with Efficient Hypervisor-Enforced Intra-Domain Isolation", Proceedings of the 22nd ACM SIGSAC Conference on Computer and Communications Security, Oct. 2015, pp. 1607-1619.
Srivastava et al., "Tamper-Resistant, Application-Aware Blocking of Malicious Network Connections", School of Computer Science, Georgia Institute of Technology, 2008, pp. 39-58.
Yadav et al., "Impact & Analysis of Virtual Workspace on Grid Computing", International Journal of Science & Technology (IJST), vol. 2, Issue 2, Apr. 2012, pp. 24-32.
Yee et al., "Native Client: A Sandbox for Portable, Untrusted x86 Native Code", 2009 30th IEEE Symposium on Security and Privacy, 2009, pp. 79-93.

* cited by examiner

NETWORK ISOLATION WITH CLOUD NETWORKS

CROSS-REFERENCE TO RELATED APPLICATION

This application claims the benefit of U.S. Provisional Application Ser. No. 62/563,237, filed Sep. 26, 2017, the contents of which are incorporated by reference herein.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware The security and privacy of the user of the infected host computer system may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions the author of the downloaded malware may desire. For example, the malware may perform a reconnaissance of the infected host computer system, determine system privileges, access local files, access security tokens, and/or attempt infection or access of other network resources accessible from the infected computer system

SUMMARY OF THE INVENTION

Systems and methods are disclosed for a sandbox based network isolation system configured to protect cloud based assets. A host computer system may include a processor and a memory. The host computer system may include a workspace. One or more applications may run in the workspace via a first memory space (e.g., a trusted memory space). The host computer system may include an isolated computing environment. One or more isolated applications may run in the isolated computing environment via a second memory space (e.g., an untrusted memory space). The isolated computing environment may be isolated from the workspace by an internal isolation firewall. The internal isolation firewall may prevent communication between the isolated computing environment and the workspace. The internal isolation firewall may segregate the first memory space from the second memory space using a sandbox. The sandbox may enforce one or more policies for communication between the first memory space and the second memory space. For example, the internal isolation firewall may allow communication between the isolated computing environment and the workspace if the user of the host computer system allows the communication. The host computer system may prompt the user to allow the communication.

The isolated applications may have access to one or more Internet destinations (e.g., untrusted Internet destinations). The isolated applications may communicate with the Internet destinations via an authentication device (e.g., a proxy server). For example, the authentication device may prevent the isolated applications from communicating with the Internet destinations until after the isolated computing environment has authenticated with the authentication device. There may be more than one (e.g., two) authentication devices, which may include, for example, an Internet-based proxy server and a local network-based proxy server. The host computer system may determine which authentication device to send web traffic to based on, for instance, the network and/or the application.

The isolated applications may include an application that accesses an Internet-based cloud service via a network. The network may be, for example, a local area network (LAN), a wide area network (a WAN), a cellular network, a Wi-Fi network, a digital subscribers line (DSL) network, a cloud computing network, a data center, and/or a satellite network. The host computer system may be connected to multiple networks at the same time. For example, the host computer system may be simultaneously connected to a Wi-Fi network and a LAN. The Internet-based cloud service may be, for example, an Infrastructure as a Service (IaaS), a Software as a Service (SaaS), and/or a Platform as a Service (PaaS).

A cloud computing system may include a cloud computing network and one or more proxies. The cloud computing network may include a server. server may include one or more (e.g., two) sets of applications. For example, one set of applications (e.g., trusted applications) may run in a workspace and one set of applications (e.g., isolated applications) may run in an isolated computing environment. The server may include an internal firewall that isolates the workspace from the isolated computing environment. The internal firewall may allow communication between the workspace and the isolated computing environment if, for example, the communication is in a predetermined format. The isolated computing environment may be implemented using, for example, a sandboxed computing environment and/or a virtual machine. The cloud computing system may include a border firewall that segregates the cloud computing network from one or more internet destinations.

The server may perform a processing task on behalf of a client device. For example, the server may receive input data from the client device and may send data to the client device. The processing task may include one or more of an Infrastructure as a Service (IaaS), a Software as a Service (SaaS), and/or a Platform as a Service (PaaS).

The proxies may control communication between the server and one or more Internet resources. For example, the proxies may allow communication between the isolated applications and the Internet resources, and may block communication between the trusted applications and the Internet resources. The proxies may include a first proxy and a second proxy, and the server may determine whether to send traffic to the first proxy or the second proxy based on, for example, user-provided credentials.

A host computer system may include a processor and a memory that may be configured to implement a first memory space, a second memory space, and/or a first firewall. The first memory space may be configured to enable storage and/or operation of a workspace. The workspace may be configured to execute a first set of one or more applications and processes running on an operating system of the host computer system;

The second memory space may be configured to enable storage and/or operation of a second set of one or more applications and processes associated with a sandboxed computing environment. The sandboxed computing environment may be configured to run on the operating system. The second set of one or more applications and processes may be configured to access the Internet and/or other untrusted resources (e.g., an untrusted network destination). The sandboxed computing environment may be enforced via a sandbox container process that may segregate the workspace associated with the first memory space from the sandboxed computing environment associated with the second memory space. The sandbox container process may be configured to prevent data from being communicated between the sandboxed computing environment and the workspace, for example, without an explicit user input. The sandboxed computing environment may be configured to determine whether to send web traffic to a proxy device (e.g., such as a network-based web proxy), a first internet-based web proxy, and/or a second internet-based web proxy.

The first firewall may be configured to operate between the workspace of the first memory space and a network (e.g., a local area network (LAN), a wide area network (WAN), a cellular network, a Wi-Fi network, a digital subscribers line (DSL) network, a cloud computing network, a data center, an ad-hoc network, a satellite network, a cable modem network, etc.). The first firewall may be a host-based firewall. The first firewall may be configured to determine whether the host computer system is connected to a trusted network or an untrusted network. The first firewall may implement a first configuration when the host computer system is connected to the trusted network. The first configuration may be associated with blocking incoming traffic to the host computer system that does not come from one or more predefined devices and/or via one or more predefined ports. The first firewall may implement a second configuration when the host computer system is connected to the untrusted network. In the second configuration, the first firewall may prevent unauthorized communication between the first set of one or more applications and processes and one or more untrusted network destinations.

The sandboxed computing environment may be configured to determine whether to send web traffic to a network-based web proxy, a first internet-based web proxy, and/or a second internet-based web proxy. For example, the sandboxed computing environment may be configured to send the web traffic to the first internet-based web proxy when the host computer system is connected to a trusted network and the sandboxed computing environment may be configured to send the web traffic to the second internet-based web proxy when the host computer system is connected to an untrusted network. As another example, the sandboxed computing environment may be configured to send the web traffic to the network-based web proxy when the host computer system is connected to a trusted network and the sandboxed computing environment may be configured to send the web traffic to the first internet-based web proxy when the host computer system is connected to an untrusted network. As another example, the sandboxed computing environment may be configured to send the web traffic to the first internet-based web proxy when the host computer system is connected to a trusted network and when the host computer system is connected to an untrusted network.

DETAILED DESCRIPTION

Systems and methods are disclosed for a sandbox based network isolation system configured to utilize and/or protect cloud based assets. For example, the sandbox based network isolation may protect cloud provided networks. The sandbox based network isolation may protect one or more assets within the cloud provided networks. For example, the one or more assets may include servers, server networks, storage devices, storage networks, enterprise networks, local networks, and/or data centers. The one or more assets may implement the sandbox based network isolation system. The sandbox based network isolation system may isolate a host computing system's communication with one or more untrusted network destinations. The sandbox based network isolation system may protect the host machine from one or more of command and control infection, data exfiltration, or general automated infection that can occur from communicating with the untrusted network destinations. For example, the sandbox based network isolation system may restrict web related traffic between the one or more cloud based assets and untrusted network destinations to a separate, authenticated channel (e.g., between protected and/or trusted devices within the network and an intermediate device). As another example, the sandbox based network isolation system may restrict traffic (e.g., web related traffic) between devices (e.g., cloud-based devices) using one or more cloud based assets.

A cloud based asset may securely browse, access, and/or communicate with untrusted network destinations, including but not limited to resources accessible via the Internet. The cloud based asset may be connected to a network (e.g., a local area network (LAN), a wide area network (WAN), a cellular network, a Wi-Fi network, a digital subscribers line (DSL) network, a cloud computing network, a data center, an ad-hoc network, a satellite network, a cable modem network, etc.). The cloud-based asset may be a host computer system that is a physical machine, a virtual machine, or a physical machine with a virtual machine operating thereon. The cloud-based asset may include, for example, a server. The isolation may be enforced via the host computer system itself and/or via one or more network entities located within the network.

A device with a sandbox based network isolation system may travel between, connect to, and/or communicate with more than one network environment. For example, a device with a sandbox based network isolation system may travel between, connect to, and/or communicate with one or more of a LAN, a WAN, a WWAN, a cellular network, a digital subscriber line (DSL) network, a Wi-Fi network, a LPWA network, a satellite network, an infrastructure as a service (IaaS) network, a Software as a Service (SaaS) network), a platform as a service (PaaS) network, and/or the like. The device may be configured to provide network isolation by using a host-based firewall, an internal isolation firewall, and/or a segregation of memory space. The host-based firewall may enable network isolation of the device across different network environments. For example, the host-based firewall may prevent communications from other devices in the different network environments.

A device may be configured to use one or more proxy devices to access untrusted network destinations. For example, the device may use a first proxy device when connected to a trusted network. The device may use a second proxy device when connected to an untrusted network. The first proxy device may be an intermediate proxy device, for example, such as a network-based web proxy or an internet-based (e.g., cloud-based) web proxy. The second proxy device may be an internet-based web proxy. As another example, the device may use a single internet-based (e.g., cloud-based) web proxy whether connected to a trusted network or an untrusted network.

Internet isolation, or also known herein as communication isolation, may isolate communications associated with one or more web-based applications (e.g., Internet-based cloud services) from other network communications. For example, the web-based applications may communicate via a first communication channel and the other network communications may use one or more other communication channels. The first communication channel may be isolated from the one or more other communication channels. The first communication channel may be established with a web proxy. The web-based applications may include web browsers, file transfer applications, email applications, chat or instant messaging applications, peer-to-peer (P2P) file sharing applications, automatic web backup applications (e.g., to cloud services), anti-virus and other security applications, collaboration software applications, remote desktop applications, screen and resource sharing applications, gaming applications, applications that rely on cloud resources for processing resources, and/or the like. Examples of web browsers may include Internet Explorer, Safari, Mozilla, Chrome, etc. The file transfer applications may include FileZilla, WinSCP, CyberDuck, FireFTP, etc. The collaboration software applications may include WebEx, LiveMeeting, HP Virtual Room, etc. As may be appreciated, many of these types of applications rely on robust communication networks that allow the application to connect to and communicate with remote locations. However, such reliance can create avenues of attack for malware and other exploits that can utilize the capacities and resources offered to these applications as a means to attack and or control the host computing system.

Systems and methods are described to provide a layer of isolation between these diverse types of applications and untrusted network destinations in order to prevent malware from effectively exfiltrating data from the host computer system and/or establishing command and control channels with an attacker resources in order to attempt to gain control of the host computing system. For example, the communication isolation may protect a network from a computer system operating within the network, that runs a collaboration software. The computer system may isolate the collaboration software from other applications and/or processes operating on the computer system.

Communication isolation may be provided via untrusted memory space segregation. The host computer system may have a sandbox protected application or process and/or an internal isolation firewall running thereon. For example, one or more of the web browsers, file transfer applications, email applications, chat or instant messaging application, P2P file sharing applications, automatic web backup application, anti-virus and other security applications, collaboration software applications, remote desktop applications, screen and resource sharing applications, gaming applications, applications that rely on cloud resources for processing resources, and/or the like may wholly or partially be contained in a sandboxed computing environment. In an example, other isolation methods such as operating the applications within a virtual machine may be used.

The sandbox protected application or process may operate within a sandboxed computing environment (e.g., an isolated computing environment). The sandboxed computing environment may include resources (e.g., a limited set of resources) allocated for operation of a sandbox container process. The sandboxed computing environment may be enforced via the sandbox container process. The sandbox container process may be a security mechanism used to separate the sandboxed computing environment from other applications and/or processes that may be running on a workspace of the host computer system. The sandboxed container process may be configured to enable one or more applications and/or processes (e.g., such as a browser process) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace.

The terms "sandboxed computing environment" and "isolated computing environment" may be used interchangeably herein. For example, they may refer to a memory space that is isolated (e.g., by use of an internal isolation firewall) from another memory space (e.g., a workspace). Applications running in the isolated computing environment may be able to interact with one or more Internet resources, for example via one or more proxy servers and/or authentication devices. An isolated computing environment may be implemented using a sandbox container and/or other isolation techniques such as a virtual machine.

The workspace may include one or more processes operating within the operating system that are not restricted by the sandbox container process. The operating system of the host computer system may include a set of resources configured to enable operation of the workspace and the sandbox container process.

The sandbox container process may have access to one or more operating system and/or kernel processes in order to enforce isolation between the workspace associated with the first memory space and the sandboxed computing environment associated with the second memory space. The sandbox container process may enforce the segregation using techniques such as namespace isolation such that processes running in the sandboxed computing environment in the second memory space are restricted from accessing the first memory space including the workspace (e.g., and vice versa). The sandbox container process may restrict access to certain resources by processes running in the sandboxed computing environment. The sandboxed container process may allow the workspace and the sandboxed computing environment to share access to the host operating system and host operating resources (e.g., including the kernel and libraries) while enforcing the segregation of the memory spaces access by the workspace and the sandboxed computing environment. In this manner, the sandbox container process may permit isolation of the sandboxed computing environment without requiring the sandboxed computing environment to boot a separate operating system, load separate libraries, etc., which would require separate private memory for those files.

The one or more processes or applications operating within the sandboxed computing environment may be permitted to access untrusted network destinations via an intermediate connection device. The intermediate connection device may be a web proxy or a proxy server, for example. The intermediate connection device may include one or more (e.g., two) proxy servers. For example, the intermediate connection device may include a network-based proxy server and an Internet-based proxy server. The one or more processes or applications operating within the sandboxed computing environment may connect to the untrusted network destinations as a dedicated network interface device with using a specific Internet Protocol (IP) address. The one or more processes or applications operating within the sandboxed computing environment may be referred to as sandboxed processes or applications. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with a respective network. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the one or more processes or applications operating within the sandboxed computing environment may be allowed to communicate with the untrusted network destination(s), but other communication from the host computer system (e.g., communications originating from outside the sandboxed computing environment such as from within the workspace) to the untrusted network destination(s) may be prevented.

Communication isolation may be provided via a host-based firewall. The host-based firewall may be configured to prevent unauthorized communication between applications and/or processes operating in the workspace of the host computer system to other devices on the network over which the host computer is communicating. The host-based firewall may be configured to block incoming communications to the workspace of the host computer system, except for predetermined trusted devices and/or predetermined network ports. The host-based firewall may allow outgoing communications to be sent from a process in the workspace to a non-web-based (e.g., LAN destination) destination and/or a web-based (e.g., LAN destination) destination that are considered trusted.

Communication isolation may be provided via an internal isolation firewall. The internal isolation firewall may enable separation between the sandboxed computing environment and the workspace. The applications and/or processes operating within the sandboxed computing environment may be prevented from accessing any additional resources of the host computer system or may be prevented from accessing any additional resources of the host computer system without explicit user action. For example, the internal isolation firewall may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host system generally, such as local area networks and secure memory regions.

The internal isolation firewall may allow certain actions to be performed with approval of the user of the host system. For example, an application and/or process operating within the sandboxed computing environment may be allowed access to the host system to perform one or more of a cut or copy of data, a paste of data, a printing of data to a local printer, a file transfer, and/or the like. The host computer system may prevent one or more other transfers of data between the sandboxed computing environment and the workspace except those user initiated actions described herein. For example, the sandbox container process may prevent unauthorized data transfers between the sandboxed computing environment and the workspace.

Figure 1:
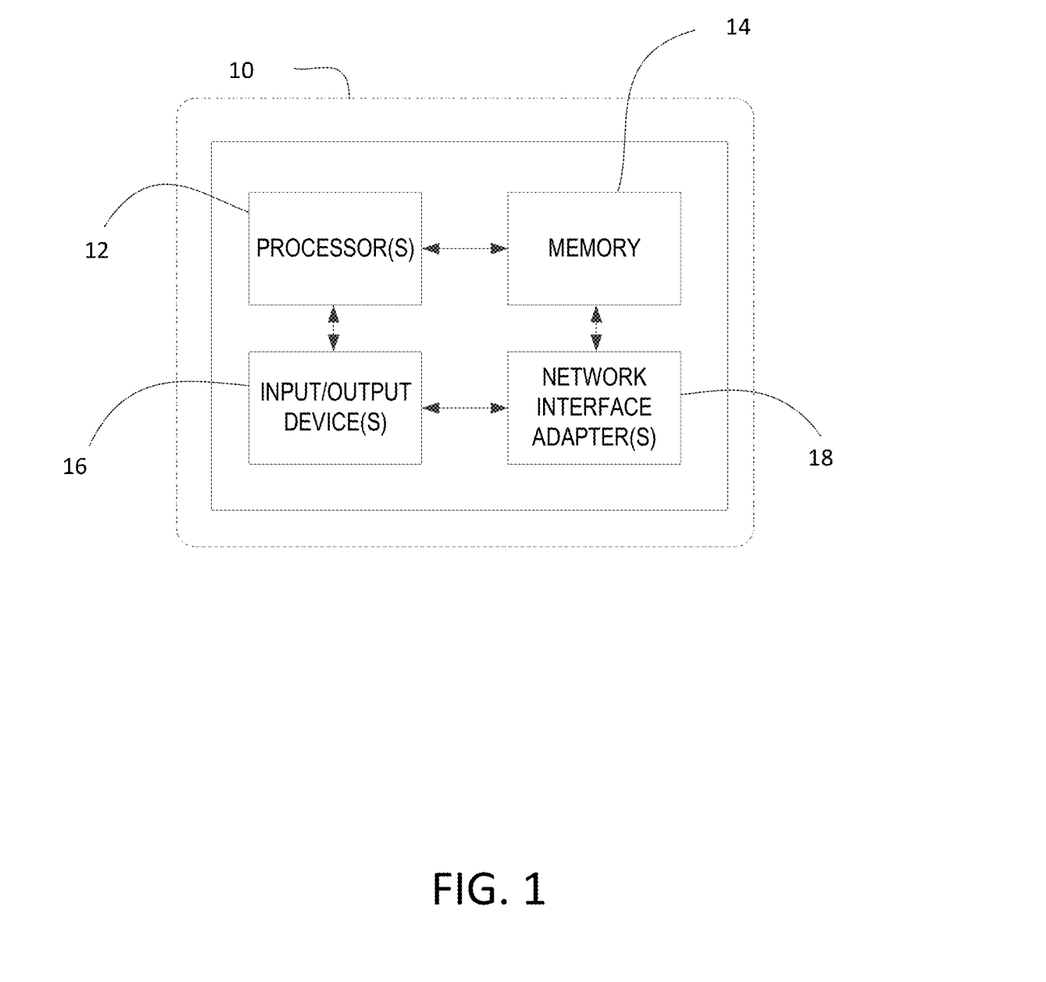
FIG. 1 depicts an example host computer system.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/ or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected application or process may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process may prevent the malware toolset from performing a reconnaissance of the host computer system to assess what data is available from the host computer system, such as computing resources, files, network information, additional network connectivity, etc. The sandbox container process (e.g., the internal isolation firewall) may prevent the data on the host computer system from being reported back to the remote device that sent the malware to the host computer and/or any other remote devices.

The sandbox container process may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process may prevent the malware toolset from accessing local files stored on the host computer system. For example, the sandbox container process may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access other websites for denial of service attacks, and/or convert the infected host computer system into a source of malicious software from which toolsets or secondary payloads are downloaded to other, subsequently infected, host computer systems.

Figure 2:
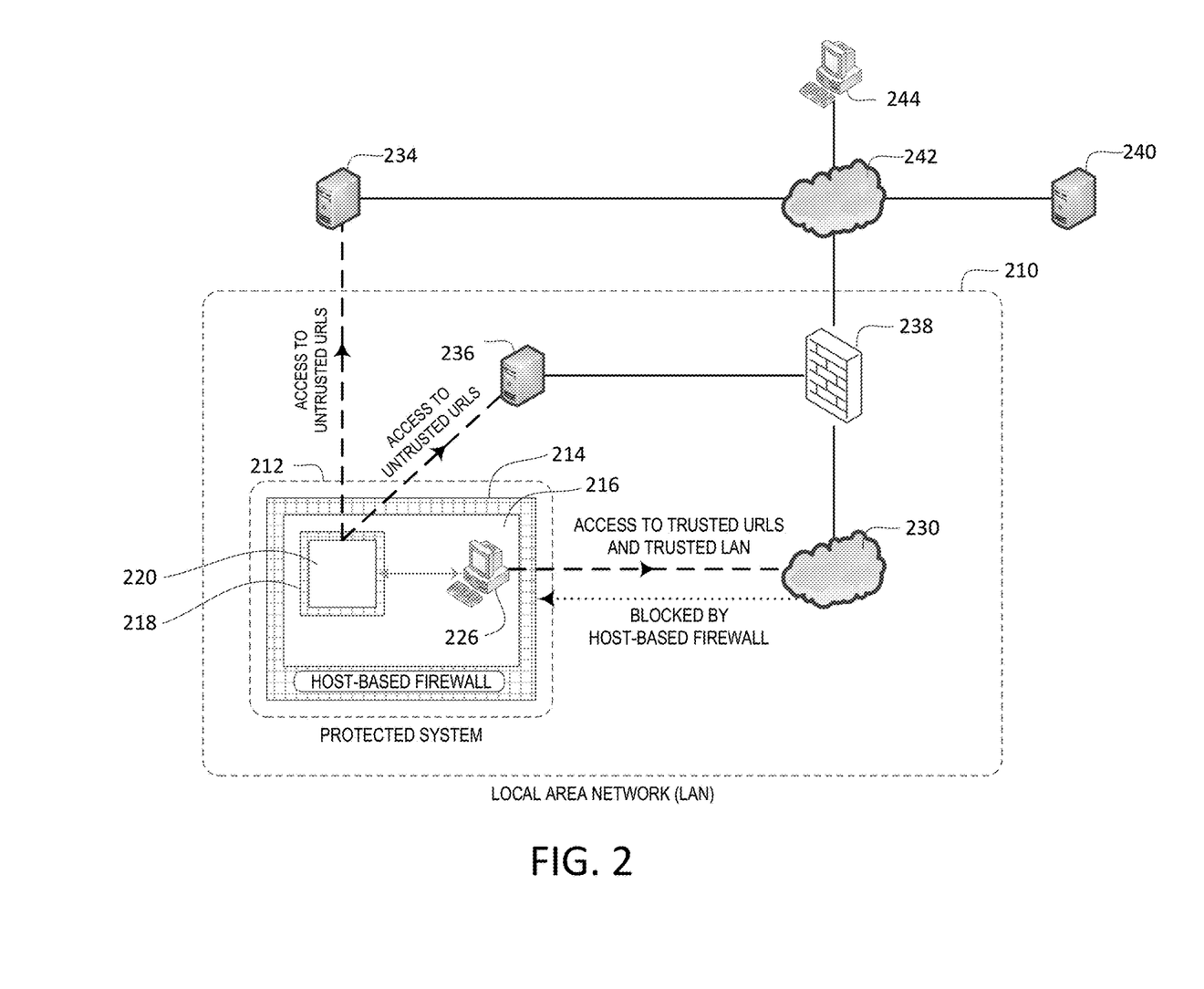
FIG. 2 depicts an example host computer system connected to a local area network (LAN), the example host computer system using a sandbox based network isolation system.

FIG. 2 depicts an example host computer system 212 connected to a local area network (LAN) 210, the example host computer system 212 using a sandbox based network isolation system. The LAN 210 may include a plurality of physical and/or virtual devices. The LAN 210 may include a plurality of host computer systems. The host computer system 212 may transmit electrical data signals to one or more other host computer systems on the LAN 210. Each of the host computer systems may be identified by a unique local area network address. The LAN 210 may include a router, a border firewall 238, and/or a LAN-based web proxy 236. The host computer system 212 may send web traffic (e.g., to one or more trusted URLs) and/or non-web traffic to a trusted network 230 via the operating system 226. The host computer system 212 may send web traffic to one or more untrusted network destinations (e.g., untrusted URLs) using one or more of the border firewall 238, the LAN-based web proxy 236, a first internet-based web proxy 234, and/or another proxy device (e.g., such as second internet-based web proxy 240). For example, the host computer system 212 may access the internet 242 and/or a device on the internet 242 via the trusted network 230, the border firewall 238, the LAN-based web proxy 236, the first internet-based web proxy 234, and/or another proxy device.

The host computer system 212 may include a host-based firewall 214, an operating system 226, a sandboxed computing environment (e.g., an isolated computing environment) 220, an internal isolation firewall (e.g., an internal firewall) 218, and a workspace 216. The host computer system 212 may be any host computer system, such as a cell phone, a pager, a personal computer (PC), a laptop, a vehicle computer system, a kiosk computer system, a server, a workstation, a tablet, a smartphone, a router, a controller, a microcontroller, and/or any other processing and/or communication device. The host computer system 212 may be a cloud based asset. The host computer system 212 may be operatively connected with one or more user-accessible data entry devices, a display device viewable by a user, and/or a computer-accessible data storage. One or more application programs may run on the operating system 226.

As an example, the host computer system 212 may be a PC, with 4 GB RAM and 146 GB hard disk computer-accessible storage, a monitor, a keyboard, and a mouse. The operating system 226 may be Windows-based, Linux-Based, Macintosh-based, and/or the like. The computer-accessible storage may store data corresponding to one or more software programs (e.g., computer-readable instructions) stored on the host computer system 212 for common operation. The software programs may include word processing programs, accounting programs, remote connectivity programs, and/or other types of applications.

The host computer system 212 may be configured to isolate communication with untrusted network destinations. The host computer system 212 may isolate communication with untrusted network destinations using one or more of the host-based firewall 214, a border firewall 238, a LAN-based web proxy 236, the first internet-based web proxy 234, the second internet-based web proxy 240, an internal isolation firewall 218, or a segregation of untrusted memory space.

The host-based firewall 214 may enable isolation of the host computer system's communication with one or more untrusted network destinations by preventing lateral communication with other devices connected to a trusted network 230. For example, the host computer system 212 may receive untrusted traffic from the trusted network 230. The host-based firewall 214 may be configured to block the untrusted traffic from the trusted network 230. The host-based firewall 214 may be configured to block all incoming traffic from the trusted network 230. The host-based firewall 214 may be configured to allow traffic received by the host computer system 212 via one or more predetermined devices and/or ports. One or more devices (e.g., predetermined devices) connected to the trusted network 230 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the host computer system 212, for example the Windows operating system firewall. The host-based firewall 214 may be implemented using software for configuring and/or implementing restrictive ingress and/or egress policies on the host computer system 212.

The trusted network 230 may be a virtual-based network, a hardware-based network, a cloud based network, or a combination thereof. The trusted network 230 may be configured as a cloud provided network, a server network, a data center network, a storage network, an enterprise network, a local network, an office network, or a combination thereof. The trusted network 230 may manage a plurality of assets, that may include one or more of virtual-based assets, hardware-based assets, or cloud-based assets.

The sandboxed computing environment 220 may include resources (e.g., a limited set of resources) allocated to operation of a sandbox container process. The sandboxed computing environment 220 may be enforced via the sandbox container process. The sandbox container process may be a security mechanism used to separate resources associated with the sandboxed computing environment 220 from other applications and/or processes that may be running on a workspace 216 of the host computer system 212. The sandboxed container process may be configured to enable one or more applications and/or processes (e.g., such as a browser process) being executed within the sandboxed computing environment 220 to access the resources allocated for operation of the sandbox container process. For example, the one or more applications and/or processes being operated within the sandboxed computing environment 220 may be allowed to access memory associated with the sandboxed computing environment 220. The memory associated with the sandboxed computing environment 220 may be separate from memory that is configured to enable storage and operation of the workspace 216.

The workspace 216 may include one or more processes operating within the operating system 226 that are not restricted by the sandbox container process. The operating system 226 of the host computer system 212 may include a set of resources configured to enable operation of the workspace 216 and the sandbox container process.

The LAN-based web proxy 236 may enable isolation of the host computer system 212 from one or more untrusted network destinations. The LAN-based web proxy 236 may be configured to allow one or more processes and/or applications (e.g., such as a browser process, an email process, etc.) operating within the sandboxed computing environment 220 of the host computer system 212 to access an untrusted network destination. A sandbox container process may enable the sandboxed computing environment 220. The sandbox container process may authenticate with the LAN-based web proxy 236 on behalf of the one or more processes and/or applications operating within the sandboxed computing environment. The sandbox container process may be configured to authenticate with the LAN-based web proxy 236 using preconfigured credentials stored, for example, within an encrypted configuration file. When the sandbox container process has successfully authenticated with the LAN-based web proxy 236, the LAN-based web proxy 236 may allow the one or more processes and/or applications operating within the sandboxed computing environment 220 to access the untrusted network destination.

The internet-based web proxies 234, 240 may enable isolation of the host computer system 212 from one or more untrusted network destinations. The internet-based web proxies 234, 240 may be configured to allow one or more processes and/or applications (e.g., such as a browser process, an email process, etc.) operating within the sandboxed computing environment 220 of the host computer system 212 to access an untrusted network destination. A sandbox container process may enable the sandboxed computing environment 220.

The host computer system 212 may be pre-configured to use one or more of the internet-based web proxies 234, 240. For example, the host computer system 212 may be pre-configured with a configuration file associated with one or more of the internet-based web proxies 234, 240. The host computer system 212 may search for the internet-based web proxies 234, 240. For example, the host computer system 212 may perform a domain name server (DNS) search to find the internet-based web proxy 234. The LAN 200 may provide a load balanced solution to establish connection with the internet based web proxies 234, 240. The sandbox container process may authenticate with one or more of the internet-based web proxies 234, 240 on behalf of the one or more processes and/or applications operating within the sandboxed computing environment 220. The sandbox container process may be configured to authenticate with one or more of the internet-based web proxies 234, 240 using preconfigured credentials stored, for example within an encrypted configuration file. When the sandbox container process has successfully authenticated with one or more of the internet-based web proxy 234, 240, the internet-based web proxies 234, 240 may allow the one or more processes and/or applications operating within the sandboxed computing environment 220 to access the untrusted network destination.

To which web proxy the sandboxed computing environment 220 sends web traffic may depend on whether the host computer system 212 is connected to a trusted network or an untrusted network. When the host computer system 212 is connected to a trusted network (e.g., such as LAN 210), the sandboxed computing environment 220 may send web traffic to the first internet-based web proxy 234 and/or the LAN-based web proxy 236. When the host computer system 212 is connected to an untrusted network, the sandboxed computing environment 220 may send web traffic to the first internet-based web proxy 234 and/or the second internet-based web proxy 240. As an example, the sandboxed computing environment 220 may be configured to use the same internet-based web proxy (e.g., such as internet-based web proxy 234) when the host computer system 212 is connected to a trusted network or an untrusted network. As another example, the sandboxed computing environment 220 may be configured to use the first internet-based web proxy 234 when the host computer system 212 is connected to a trusted network (e.g., such as LAN 210) and may be configured to use the second internet-based web proxy 240 when the host computer system 212 is connected to an untrusted network. As another example, the sandboxed computing environment 220 may be configured to use the first internet-based web proxy 234 and/or the LAN-based web proxy 236 when the host computer system 212 is connected to a trusted network (e.g., such as LAN 210) and may be configured to use the second internet-based web proxy 240 when the host computer system 212 is connected to an untrusted network.

The internet-based web proxy 234 may enable isolation of host computer system 244 from one or more untrusted network destinations. For example, host computer systems (e.g., such as host computer system 244) that are connected to untrusted networks may send web related (e.g., untrusted) traffic to the internet-based web proxy 234. For example, the host computer system 244 may be configured to enable a sandboxed computing environment (e.g., such as the sandboxed computing environment 220) via a sandbox container process. The internet-based web proxy 234 may be configured to allow one or more processes and/or applications (e.g., such as a browser process, an email process, etc.) operating within the sandboxed computing environment of the host computer system 244 to access an untrusted network destination.

The LAN 210 may be accessed (e.g., remotely accessed) by a host computer system 244 (e.g., such as host computer system 212). The host computer system 244 may access the LAN 210 via a VPN connection. The VPN connection may enable the connectivity and features associated with a direct connection to the LAN 210. The host computer system 244 may be configured to locally connect to the LAN 210. When the host computer system 244 is remotely connected to the LAN 210, the sandboxed computing environment may be configured to send web traffic to a first internet-based web proxy 234 and/or a second internet-based web proxy 240. For example, when the host computer system 244 is connected to an untrusted network, the sandboxed computing environment may send the web traffic to the first internet-based web proxy 234 and/or the second internet-based web proxy 240. As an example, the sandboxed computing environment may be configured to use the same internet-based web proxy (e.g., such as internet-based web proxy 234) when the host computer system 244 is connected to a trusted network or an untrusted network. As another example, the sandboxed computing environment may be configured to use the first internet-based web proxy 234 when the host computer system 244 is connected to a trusted network (e.g., such as LAN 210) and may be configured to use the second internet-based web proxy 240 when the host computer system 244 is connected to an untrusted network. As another example, the sandboxed computing environment may be configured to use the first internet-based web proxy 234 and/or a network-based web proxy (e.g., such as the LAN-based web proxy 236) when the host computer system 244 is connected to a trusted network (e.g., such as LAN 210) and may be configured to use the second internet-based web proxy 240 when the host computer system 244 is connected to an untrusted network. As another example, the sandbox computing environment may be configured to use the network-based web proxy when the host computer system 244 is connected to an untrusted network with an encrypted connection channel (e.g., a VPN connection) to a trusted network (e.g., LAN 210) and may be configured to use one or more of the internet-based web proxies 234, 240 when connected to an untrusted network without an encrypted connection channel to a trusted network (e.g., LAN 210).

The LAN 210 may be accessed (e.g., remotely accessed) by the host computer system 244. The host computer system 244 may access the LAN 210 via a VPN connection. The VPN connection may enable the connectivity and features associated with a direct connection to the LAN 210.

The host computer system 244 may be pre-configured to use the internet-based web proxy 234. For example, the host computer system 244 may be pre-configured with a configuration file associated with the internet-based web proxy 234. The host computer system 244 may search for the internet-based web proxy 234. For example, the host computer system 244 may perform a domain name server (DNS) search to find the internet-based web proxy 234. The host computer system 244 may perform a local host lookup, reference a configuration file, etc. to determine information needed to find the internet-based web proxy 234. The sandbox container process operating within the host computer system 244 may authenticate with the internet-based web proxy 234 on behalf of the one or more processes and/or applications operating within the sandboxed computing environment. The sandbox container process may be configured to authenticate with the internet-based web proxy 234 using preconfigured credentials stored, for example, within an encrypted configuration file. When the sandbox container process has successfully authenticated with the internet-based web proxy 234, the internet-based web proxy 234 may allow the one or more processes and/or applications operating within the sandboxed computing environment to access the untrusted network destination.

The proxy devices (e.g., such as internet-based web proxy 234, LAN-based web proxy 236, and/or internet-based web proxy 240) may be configured to enforce a blacklist for host computer systems connected to untrusted networks. For example, the host computer systems on untrusted networks may send web related traffic to the internet-based web proxy 234, for example, via the internet 242. The internet-based web proxy 234 may allow or prevent the web related traffic based on the network destination. If the network destination is on the blacklist, the internet-based web proxy 234 may block the web related traffic. As described herein, the blacklist may be tailored based on one or more of the network to which the host computer system is connected, a host computer system ID, the user, the access level associated with the user, etc.

The border firewall 238 may enable isolation of the host computer system 212 (e.g., the workspace 216) from one or more untrusted network destinations (e.g., Internet destinations). The border firewall 238 may be configured to restrict traffic to the untrusted network destinations (e.g., the Internet 242) from the LAN-based web proxy 236 and/or the trusted network 230. The host computer systems 212 may access a whitelisted web server and/or an untrusted web server via a web proxy device, for example, via the border firewall 238. The border firewall 238 may be configured to block communication between the host computer system 212 and one or more untrusted network destinations, for example, the Internet 242. For example, the border firewall 238 may be configured to block untrusted traffic that is not routed through the LAN-based web proxy 236. The border firewall 238 may be configured to block untrusted traffic that is not received from one or more predetermined devices. The border firewall 238 may be configured to block untrusted traffic that is not received via one or more predetermined network ports.

The host computer system 212 may enable the host-based firewall 214. The host-based firewall 214 may prohibit and/or prevent communication (e.g., direct communication) between the host computer system 212 and other devices on the network 230. Each device on the trusted network 230 may include a host-based firewall (e.g., such as the host-based firewall 214). The host-based firewall 214 may prohibit and/or prevent communication (e.g., direct communication) between the host computer system 212 and other devices within the trusted network 230. For example, the host-based firewall 214 may be configured to block incoming traffic from the other devices within the trusted network 230. The host-based firewall 214 may allow traffic received by the host computer system 212 via one or more predetermined devices and/or ports. For example, one or more devices (e.g., predetermined devices) on the trusted network 230 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the host computer system 212, for example the Windows operating system firewall. The host-based firewall 214 may be implemented using software for configuring and/or implementing restrictive ingress and/or egress policies on the host computer system 212.

The host computer system 212 may run the sandboxed computing environment 220. The sandboxed computing environment 220 may run within the operating system 226 of the host computer system 212. For example, the sandboxed computing environment 220 may be configured to run within a second memory space of the host computer system 212. A first memory space may be configured to enable storage and operation of a workspace configured to execute a first set of one or more applications and/or processes running on the operating system 226 of the host computer system 212. For example, a browser process may operate within the sandboxed computing environment 220. The sandboxed computing environment 220 may be prohibited from communicating with other devices within the network 230. The browser process operating within the sandboxed computing environment 220 may be configured to enable access to untrusted network destinations.

Browser solutions running within the workspace 216 of the host computer system 212 may be utilized for communication between the host computer system 212 and trusted network destinations. For example, the one or more applications or processes running within the workspace 216 of the host computer system 212 may access the trusted network destinations.

The sandboxed computing environment 220 and/or the sandbox container process may be implemented using software and/or hardware. For example, the sandboxed computing environment 220 and/or the sandbox container process may be implemented using software that is commercially available, for example, such as Invincea Endpoint Protection, Tanium Endpoint Platform, Bromium Advanced Endpoint Security, etc.

The sandboxed computing environment 220 may provide separate and/or isolated memory space from the workspace 216 of the host computer system 212. For example, the sandboxed computing environment 220 may be enforced using a sandbox container process. The sandbox container process may segregate the workspace 216 from the sandboxed computing environment 220. The first memory space (e.g., the workspace memory) may enable storage and/or operation of the workspace 216. The operating system 226 may enable operation of the sandboxed computing environment 220. The second memory space may enable storage and/or operation of one or more applications and/or processes associated with the sandboxed computing environment 220. For example, the second memory space may be reserved for storage and/or operation of the applications and/or processes running within the sandboxed computing environment 220.

The sandbox container process may isolate the first memory space and the second memory space. For example, the sandbox container process may enable the internal isolation firewall 218. The internal isolation firewall 218 may enforce a separation of the first and second memory spaces. For example, the internal isolation firewall 218 may allow a predefined set of processes to be executed within the sandboxed computing environment 220. The internal isolation firewall 218 may prevent execution, in the sandboxed computing environment 220, of any processes outside of the predefined set of processes. The second memory space may be referred to as a separate and/or isolated memory space. The sandbox container process may segregate the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory.

The host computer system 212 may be configured to connect to the trusted network 230 or an untrusted network. When the host computer system 212 is connected to the trusted network 230, the host-based firewall 214 may implement a first configuration. When the host computer system 212 is connected to the untrusted network, the host-based firewall 214 may implement a second configuration. The first configuration may be associated with blocking incoming traffic to the host computer system 212 that does not come from one or more predefined devices and/or via one or more predefined ports. In the first configuration, the host-based firewall 214 may allow outgoing traffic to be sent from one or more processes or applications in the workspace 216, for example irrespective of the type of communication protocol used. In an example, the second configuration may be associated with preventing one or more applications and/or processes operating on the workspace 216 of the host computer system 212 from communicating with one or more untrusted destinations. In an example, the second configuration may be associated with blocking all incoming traffic from the untrusted network to the host computer system 212.

When the host-based firewall 214 is configured in the second configuration, the host-based firewall 214 may allow one or more of the applications and/or process operating within the workspace 216 to communicate with a trusted network destination on condition that a predetermined set of communication protocols. The predetermined set of protocols may include communicating with the trusted network destination via a VPN client associated with the workspace 216. The trusted network destination may be located on the trusted network 230. The VPN client may be configured to establish an encrypted communication system with the trusted network destination via the untrusted network. For example, the second configuration of the host-based firewall 214 may enable one or more applications and/or processes operating within the workspace 216 to access the trusted network 230 via the untrusted network and/or the Internet 242 using the VPN client.

In this manner, the host-based firewall 214 can allow the processes or applications of the workspace 216 to send outgoing communications without restriction when implementing the first configuration (e.g., when connected to the trusted LAN), but may limit outgoing communications from the processes or applications of the workspace 216 to communications to trusted destinations that also utilize a predetermined protocol in order to communicate with the trusted destination. In both the first and second configurations, the host-based firewall 214 may block incoming communications to the workspace 216 unless the communication is from a trusted destination and uses a predetermined communication protocol.

If malware in a sandboxed computing environment 220 is able to access the resources, assets, and/or files of the operating system 226, the host computer system 212 may be considered infected and untrusted. For example, the malware may bypass the internal isolation firewall 218 via explicit user input. The host-based firewall 214 may prohibit the introduced malware from communicating with any other device on the trusted network 230. For example, the host-based firewall 214 may be configured to block incoming traffic from the trusted network 230.

Malware may be introduced to the operating system 226 from a source other than communication with the Internet 242. For example, malware may be introduced to the operating system 226 via an infected email, an infected USB memory stick, and/or another infected hardware device.

An infected and/or untrusted host computer system (e.g., regardless of the introduced malware's vector) may have no communication (e.g., direct communication) with the Internet 242. For example, the border firewall 238, the internal isolation firewall 218, and/or a proxy device (e.g., such as LAN-based web proxy 236, internet-based web proxy 234, internet-based web proxy 240, etc.) may prevent the infected and/or untrusted host computer system from communicating with the Internet 242. Without a connection to (e.g., communication with) the Internet 242, the introduced malware may be prevented from performing many toolset functions described herein or any other function that an enslaved, infected and/or untrusted host computer system may perform. Without a connection to the Internet 242, the introduced malware may not be able to transfer any data from the infected and/or untrusted host computer system to the Internet 242.

The host computer system 212 and/or the trusted network 230 may limit the adverse effects associated with a received malware. For example, the host computer system 212 and/or the trusted network 230 may prevent the received malware from using its vector to communicate data from the host computer system 212.

An author of the malware may not be aware of any level of efficacy of the introduced malware and/or its successful attack vector. The host computer system 212 and/or the trusted network 230 may prevent data of an infected and/or untrusted host computer system that may have been compromised and/or collected by the malware from being communicated to the author of the malware. For example, the host computer system 212 may prevent communication between an infected and/or untrusted host computer system and the Internet 242 (e.g., the author of the malware via the Internet 242).

Figure 3:
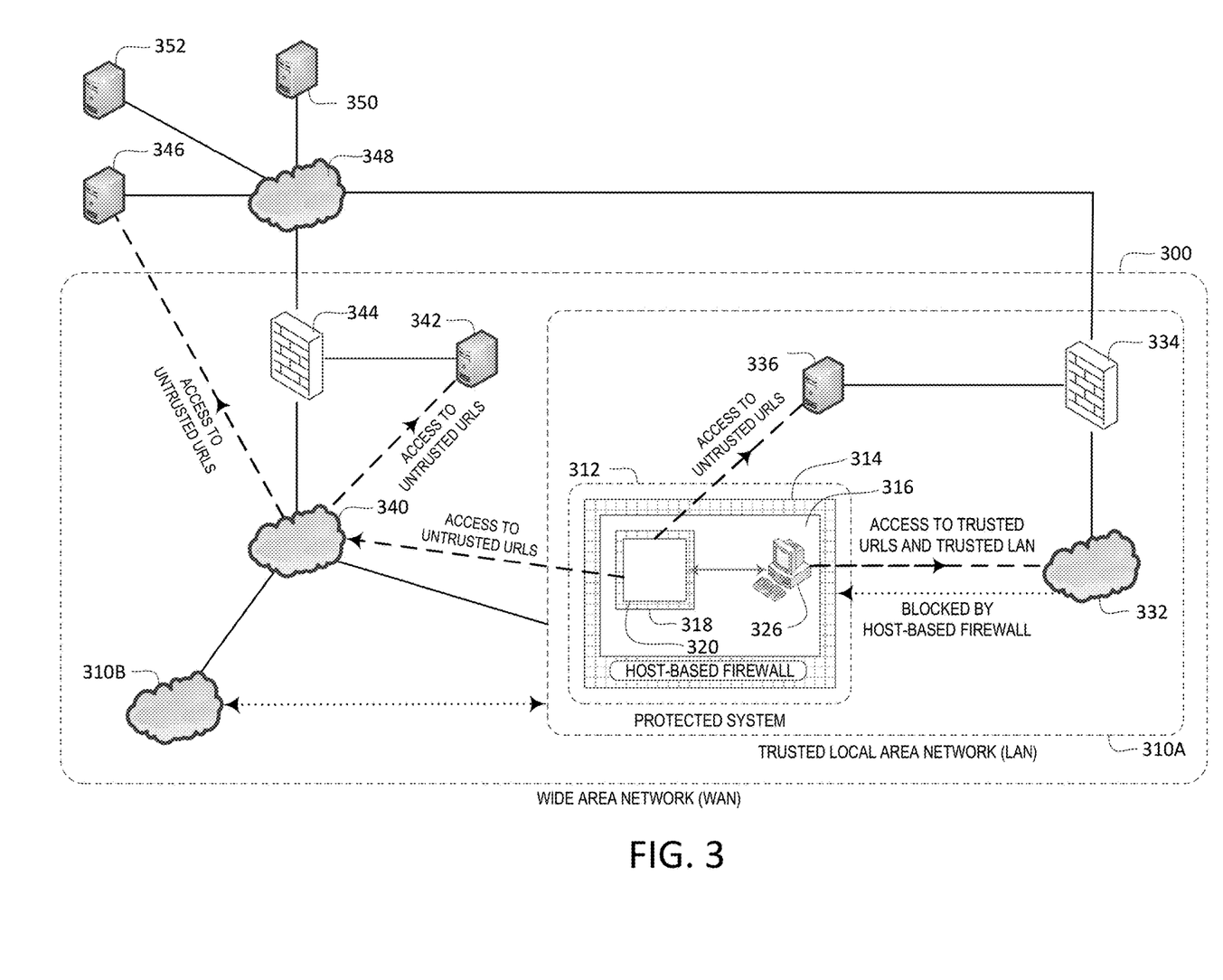
FIG. 3 depicts an example host computer system connected to a wide area network (WAN), the example host computer system using a sandbox based network isolation system.

FIG. 3 depicts an example host computer system 312 (e.g., such as the host computer system 212 shown in FIG. 2) connected to a wide area network (WAN) 300, the example host computer system 312 using a sandbox based network isolation system. The WAN 310 may include one or more trusted LANs 310A, 310B. The trusted LANs 310A, 310B may access a trusted WAN 340. The trusted WAN 340 may operate within the WAN 300. Trusted LAN 310A and trusted LAN 310B may be connected to each other, for example, via an inter-site connection. Trusted LAN 310A and trusted LAN 310B may include a plurality of physical and/or virtual devices. For example, trusted LAN 310A may include a host computer system 312. The host computer systems may transmit electrical data signals to one or more other host computer systems on the trusted LAN 310A.

The host computer system 312 may include a host-based firewall 314, an operating system 326, a sandboxed computing environment 320, an internal isolation firewall 318, and a workspace 316. The host computer system 312 may be any host computer system, such as a cell phone, a pager, a personal computer (PC), a laptop, a vehicle computer system, a kiosk computer system, a server, a workstation, a tablet, a smartphone, a router, a controller, a microcontroller, and/or any other processing and/or communication device. The host computer system 312 may be a cloud-based asset. The host computer system 312 may be a physical machine, a virtual machine, or a physical machine with a virtual machine operating thereon. The host computer system 312 may be operatively connected with one or more user-accessible data entry devices, a display device viewable by a user, and/or a computer-accessible data storage. One or more application programs may run on the operating system 326.

As an example, the host computer system 312 may be a PC, with 4 GB RAM and 146 GB hard disk computer-accessible storage, a monitor, a keyboard, and a mouse. The operating system 326 may be Windows-based, Linux-Based, Macintosh-based, and/or the like. The computer-accessible storage may store data corresponding to one or more software programs (e.g., computer-readable instructions) stored on the host computer system 312 for common operation. The software programs may include word processing programs, accounting programs, remote connectivity programs, and/or other types of applications.

The host computer system 312 may be configured to isolate communication with untrusted network destinations. The host computer system 312 may isolate communication with untrusted network destinations using one or more of the host-based firewall 314, a LAN border firewall 334, a LAN-based web proxy 336, a first internet-based web proxy 346, a second internet-based web proxy 352, the internal isolation firewall 318, or a segregation of untrusted memory space.

The host-based firewall 314 may enable isolation of the host computer system's communication with one or more untrusted network destinations by preventing lateral communication with other devices connected to a trusted network 332. For example, the host computer system 312 may receive untrusted traffic from the trusted network 332. The host-based firewall 314 may be configured to block the untrusted traffic from the trusted network 332. The host-based firewall 314 may be configured to block all incoming traffic from the trusted network 332. The host-based firewall 314 may be configured to allow traffic received by the host computer system 312 via one or more predetermined devices and/or ports. One or more devices (e.g., predetermined devices) connected to the trusted network 330 may bypass the host-based firewall 314, for example, using a predetermined set of protocols and/or ports.

The trusted LAN 310A may be a virtual-based network, a hardware-based network, a cloud based network, or a combination thereof. The trusted LAN 310A may be configured as a cloud provided network, a server network, a data center network, a storage network, an enterprise network, a local network, an office network, or a combination thereof.

The trusted LAN 310A may manage a plurality of cloud-based assets. Each of the cloud-based assets may be a host computer system that may be a physical machine, a virtual machine, or a physical machine with a virtual machine operating thereon. The trusted LAN 310A may communicate with the trusted WAN 340 (e.g., one or more devices on the trusted WAN 340). For example, one or more devices (e.g. such as the host computer system 312) may send trusted and/or untrusted traffic to the trusted WAN 340. A WAN border firewall 344 may be configured to restrict traffic to one or more untrusted network destinations (e.g., the Internet 348) from a WAN-based web proxy 342 and/or the trusted WAN 340. The trusted WAN 340 may access a whitelisted web server and/or an untrusted web server via a web proxy device, for example, via the WAN border firewall 344. The WAN border firewall 344 may be configured to block communication between the trusted WAN 340 and the one or more untrusted network destinations, for example the Internet 348. For example, the WAN border firewall 344 may be configured to block untrusted traffic that is not routed through the WAN-based web proxy 342, LAN based proxies, such for example 336, and/or predetermined devices. The WAN border firewall 344 may allow untrusted traffic that has been routed through the WAN-based web proxy 342, LAN based proxies, such for example 336, and/or predetermined devices to access the one or more untrusted network destinations.

Each host computer system on the trusted LAN 310A may be identified by a unique local area network address. The trusted LAN 310A may include a router and/or a trusted network 332 (e.g., such as trusted network 230 shown in FIG. 2). The host computer system 312 may send web traffic and/or non-web traffic to the trusted network 332, for example, via the router. The trusted LAN 310A may send web traffic to one or more untrusted network destinations using one or more of the trusted network 332, a LAN border firewall 334, a LAN-based web proxy 336 (e.g., such as LAN-based web proxy 236 shown in FIG. 2), the trusted WAN 340, the WAN border firewall 344, the WAN-based web proxy 342, or an internet-based web proxy 346 (e.g., such as the internet-based web proxy 234 shown in FIG. 2). For example, the trusted LAN 310A may access the internet 348 and/or a device on the internet 348 via the trusted WAN 340, the WAN border firewall 344, and/or the WAN-based web proxy 342.

The web traffic sent by the host computer system 312 to the trusted network 332 may be destined for trusted destinations. The trusted LAN 310A may enable a connection to a cloud-based computing system. The connection to the cloud-based computing system may be a direct connection and/or a connection through WAN 300. For example, the trusted LAN 310A may enable a connection to a cloud-based computing system using one or more of the trusted network 332, the LAN border firewall 334, the LAN-based web proxy 336, the trusted WAN 340, the WAN border firewall 344, the WAN-based web proxy 342, or the internet-based web proxy 346. The trusted LAN 310A may be part of a cloud interexchange. The trusted LAN 310A may be part of a cloud "meet me" point of presence.

The host computer system 312 may determine whether to send web traffic intended for an untrusted network destination to a LAN-based web proxy 336 or to the trusted WAN 340. The trusted WAN 340 may forward the web traffic received from the host computer system 312 to the WAN-based web proxy 342 or the internet-based web proxy 346. The trusted WAN 340 may determine which web proxy to forward the web traffic based on a configuration associated with the host computer system 312 and/or the trusted LAN 310A. The trusted WAN 340 may determine which web proxy to forward the web traffic based on the untrusted network destination.

The trusted WAN 340 may be pre-configured to use the internet-based web proxy 346. For example, the trusted WAN 340 may be pre-configured with a configuration file associated with the internet-based web proxy 346. The trusted WAN 340 may search for the internet-based web proxy 346. For example, the trusted WAN 340 may perform a domain name server (DNS) search to find the internet-based web proxy 346. The trusted WAN 340 may provide a load balanced solution to establish connection with the internet-based web proxy 346.

A device (e.g., such as the host computer system 312) on the trusted WAN 340 may determine which web proxy to send web traffic. For example, the device may include a sandboxed computing environment (e.g., such as the sandboxed computing environment 220). When the device is connected to a trusted network (e.g., such as trusted WAN 340), the sandboxed computing environment may send the web traffic to the first internet-based web proxy 346 and/or the WAN-based web proxy 342. When the device is connected to an untrusted network, the sandboxed computing environment may send the web traffic to the first internet-based web proxy 346 and/or the second internet-based web proxy 352. As an example, the sandboxed computing environment may be configured to use the same internet-based web proxy (e.g., such as internet-based web proxy 346) when the device is connected to a trusted network or an untrusted network. As another example, the sandboxed computing environment may be configured to use the first internet-based web proxy 346 when the device is connected to a trusted network (e.g., such as trusted WAN 340) and may be configured to use the second internet-based web proxy 352 when the device is connected to an untrusted network. As another example, the sandboxed computing environment may be configured to use the first internet-based web proxy 346 and/or the WAN-based web proxy 342 when the device is connected to a trusted network (e.g., such as trusted WAN 340) and may be configured to use the second internet-based web proxy 352 when the device is connected to an untrusted network.

As another example, the sandbox computing environment may be configured to use the WAN-based web proxy 342 when the host computer system 350 is connected to an untrusted network with an encrypted connection channel (e.g., a VPN connection) to a trusted network (e.g., WAN 300) and may be configured to use one or more of the internet-based web proxies 346, 352 when connected to an untrusted network without an encrypted connection channel to a trusted network (e.g., WAN 300).

The WAN 300, the trusted WAN 340, the trusted LAN 310A, and/or the trusted LAN 310B may be accessed (e.g., remotely accessed) by a host computer system 350 (e.g., such as host computer system 212 shown in FIG. 2 and/or host computer system 312 shown in FIG. 3). The host computer system 350 may access one or more of the WAN 300, the trusted WAN 340, the trusted LAN 310A, and/or the trusted LAN 310B via a VPN connection. The VPN connection may enable the connectivity and features associated with a direct connection to the WAN 300, the trusted WAN 340, the trusted LAN 310A, and/or the trusted LAN 310B. The host computer system 350 may be configured to locally connect to one or more of the trusted LANs 310A, 310B. When the host computer system 350 is remotely connected to one or more of the WAN 300, the trusted WAN 340, the trusted LAN 310A, and/or the trusted LAN 310B, the sandboxed computing environment may be configured to send web traffic to a first internet-based web proxy 346 and/or a second internet-based web proxy 352. For example, when the host computer system 350 is connected to an untrusted network, the sandboxed computing environment may send the web traffic to the first internet-based web proxy 346 and/or the second internet-based web proxy 352. As an example, the sandboxed computing environment may be configured to use the same internet-based web proxy (e.g., such as internet-based web proxy 346) when the host computer system 350 is connected to a trusted network or an untrusted network. As another example, the sandboxed computing environment may be configured to use the first internet-based web proxy 346 when the host computer system 350 is connected to a trusted network (e.g., such as trusted LAN 310A or trusted LAN 310B) and may be configured to use the second internet-based web proxy 352 when the host computer system 350 is connected to an untrusted network. As another example, the sandboxed computing environment may be configured to use the first internet-based web proxy 346 and/or a network-based web proxy when the host computer system 350 is connected to a trusted network (e.g., such as trusted LAN 310A or trusted LAN 310B) and may be configured to use the second internet-based web proxy 352 when the host computer system 350 is connected to an untrusted network.

The trusted WAN 340 may support a plurality of trusted LANs (e.g., such as trusted LAN 310A and trusted LAN 310B). The WAN-based web proxy 342 may be configured to enable access to one or more untrusted network destinations. The WAN-based web proxy 342 may enforce a blacklist associated with the trusted WAN 340, one or more of the trusted LANs, and/or one or more host computer systems.

Figure 4:
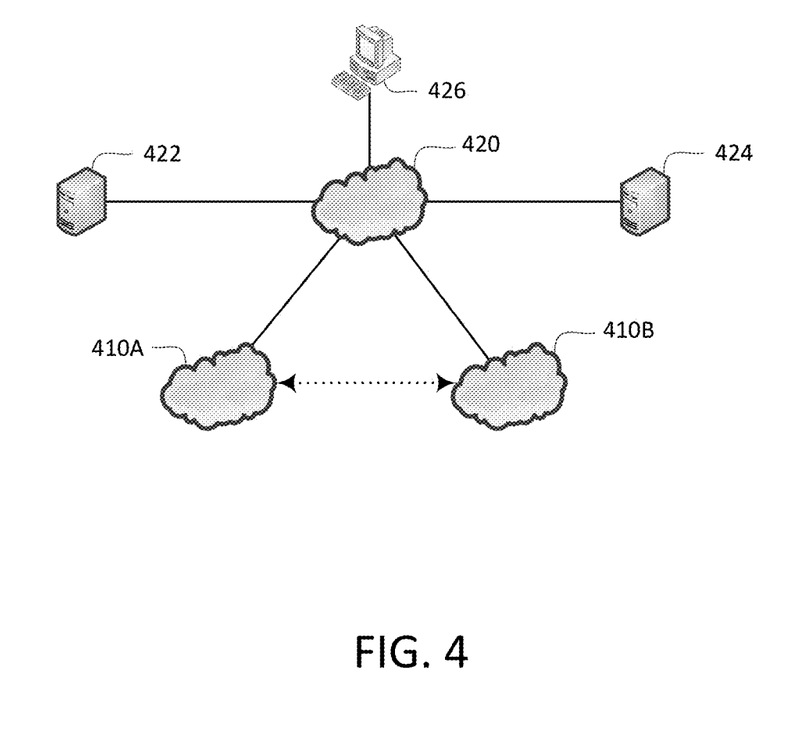
FIG. 4 depicts an example enterprise network.

FIG. 4 depicts an example enterprise network configuration. For example, one or more trusted networks (e.g., trusted networks 410A, 410B) may be configured to access the Internet 420 (e.g., a trusted or untrusted network destination). Each of the trusted networks 410A, 410B may be a trusted LAN (e.g., such as trusted LAN 310A shown in FIG. 3) or a trusted WAN (e.g., such as trusted WAN 340 shown in FIG. 3). The trusted networks 410A, 410B may be connected, for example, via an inter-site connection. Network traffic may be sent between the trusted networks 410A, 410B. For example, a device on the trusted network 410A may communicate with a device on the trusted network 410B.

Each of the trusted networks 410A, 410B may include a plurality of host computer systems (e.g., such as host computer system 212 shown in FIG. 2 and/or host computer system 312 shown in FIG. 3). Each host computer system of a respective trusted network may be configured to send electrical data signals to one or more other host computer systems on the respective trusted network. For example, the host computer systems of the LAN 410A may send data to each other. Each of the host computer systems may be identified by a unique local area network address. The trusted networks 410A, 410B (e.g., each host computer system in the trusted networks 410A, 410B) may send web traffic and/or non-web traffic to another trusted network (not shown) and/or to the Internet 420. The web traffic sent to the other trusted network and/or the Internet 420 may be destined for trusted destinations.

One or more of the trusted networks 410A, 410B may be accessed (e.g., remotely accessed) by a host computer system 426 (e.g., such as host computer system 212 shown in FIG. 2 and/or host computer system 312 shown in FIG. 3).

The host computer system 426 may access one or more of the trusted networks 410A, 410B via a VPN connection. The VPN connection may enable the connectivity and features associated with a direct connection to the trusted networks 410A, 410B. The host computer system 426 may be configured to locally connect to one or more of the trusted networks 410A, 410B. When the host computer system 426 is remotely connected to one or more of the trusted networks 410A, 410B, the sandboxed computing environment may be configured to send web traffic to a first internet-based web proxy 422 and/or a second internet-based web proxy 424. For example, when the host computer system 426 is connected to an untrusted network, the sandboxed computing environment may send the web traffic to the first internet-based web proxy 422 and/or the second internet-based web proxy 424. As an example, the sandboxed computing environment may be configured to use the same internet-based web proxy (e.g., such as internet-based web proxy 422) when the host computer system 426 is connected to a trusted network or an untrusted network. As another example, the sandboxed computing environment may be configured to use the first internet-based web proxy 422 when the host computer system 426 is connected to a trusted network (e.g., such as trusted network 410A or trusted network 410B) and may be configured to use the second internet-based web proxy 424 when the host computer system 426 is connected to an untrusted network. As another example, the sandboxed computing environment may be configured to use the first internet-based web proxy 422 and/or a network-based web proxy when the host computer system 426 is connected to a trusted network (e.g., such as trusted network 410A or trusted network 410B) and may be configured to use the second internet-based web proxy 424 when the host computer system 426 is connected to an untrusted network.

A sandbox based network isolation system may be used to prevent malware from establishing command and control on a computer system (e.g., a desktop computer, a laptop computer, a tablet, a mobile phone, etc.). For example, the sandbox based network isolation system may be configured to operate on a computer system running Windows, Linux, MacOS, iOS, Android, Windows Mobile, and/or some other operating system.

A sandbox based network isolation system may prevent malware from moving from a first computer system to a second computer system on the same network environment. For example, when a computer system in a network environment is infected with malware, the sandbox based network isolation system may prevent proliferation of the malware within the network environment.

A sandbox based network isolation system may increase the security posture of an enterprise network (e.g., a WAN, a LAN, and/or a VM infrastructure). For example, the sandbox based network isolation system may protect the enterprise network from malware, command and control attacks, viruses, and/or data exfiltration attacks.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A host computer system:
a memory; and
a processor configured to:
  implement a workspace, wherein the workspace is configured to enable operation of a first set of one or more applications or processes via a first memory space;
  implement an isolated computing environment, the isolated computing environment using a host operating system and comprising a sandboxed computing environment that uses a second memory space to enable operation of a second set of one or more applications or processes, wherein the isolated computing environment is configured to access an Internet-based cloud service via at least one application of the second set of one or more applications or processes;
  isolate the isolated computing environment from the workspace using an internal isolation firewall;
  authenticate the isolated computing environment with an authentication device; and
  communicate with a proxy server to access the Internet-based cloud service to allow communication between the at least one application and the Internet-based cloud service when the isolated computing environment has been authenticated.

2. The host computer system of claim 1, wherein the processor is configured to access the Internet-based cloud service via one or more of a local area network (LAN), a wide area network (WAN), a cellular network, a Wi-Fi network, a digital subscribers line (DSL) network, a cloud computing network, a data center, or a satellite network.

3. The host computer system of claim 1, wherein the Internet-based cloud service comprises one or more of an Infrastructure as a Service (IaaS), a Software as a Service (SaaS), or a Platform as a Service (PaaS).

4. The host computer system of claim 1, wherein the processor is configured to select the proxy server from a plurality of proxy servers, the plurality of proxy servers comprising one or more of an Internet-based proxy server or a local network-based proxy server.

5. The host computer system of claim 1, wherein the processor is configured to determine whether to send web traffic to a local network-based proxy server or an Internet-based proxy server based on a location of the host computer system.

6. The host computer system of claim 1, wherein the processor is configured to determine whether to send web traffic to a local network-based proxy server or an Internet-based proxy server based on an identity of a network to which the host computer system is connected.

7. The host computer system of claim 1, wherein the processor is configured to determine whether to send web traffic to a local network-based proxy server or an Internet-based proxy server based on an identity of the at least one application running in the isolated computing environment.

8. The host computer system of claim 1, wherein the internal isolation firewall is configured to segregate the first memory space from the second memory space, and wherein the processor is configured to enforce policies for communication between the first memory space and the second memory space using the internal isolation firewall.

9. The host computer system of claim 8, wherein the internal isolation firewall is further configured to generate a message to prompt a user of the host computer system, the message indicating whether to allow communication between the first memory space and the second memory space.

10. A cloud computing system comprising:
a cloud computing network comprising a server, wherein the server is configured to:
implement a workspace configured to enable operation of a first set of one or more applications or processes;
implement an isolated computing environment using a host operating system and comprising a sandboxed computing environment and being configured to enable operation of a second set of one or more applications or processes;
isolate the isolated computing environment from the workspace using an internal isolation firewall; and
authenticate the isolated computing environment with an authentication device; and
a proxy configured to control communication between the server and an Internet resource, wherein the proxy is configured to allow communication between the second set of one or more applications or processes running in the isolated computing environment and the Internet resource when the isolated computing environment has been authenticated and to block communication between the first set of one or more applications or processes running in the workspace and the Internet resource.

11. The cloud computing system of claim 10, wherein the server is configured to perform at least one processing task on behalf of a client device.

12. The cloud computing system of claim 11, wherein the proxy is a first proxy, and the server is configured to determine whether to send traffic to the first proxy or a second proxy.

13. The cloud computing system of claim 12, wherein the server is configured to determine whether to send traffic to the first proxy or the second proxy based on user-provided credentials.

14. The cloud computing system of claim 10, further comprising a border firewall configured to segregate the cloud computing network from one or more Internet destinations.

15. The cloud computing system of claim 10, wherein the internal isolation firewall is further configured to allow communication between the workspace and the isolated computing environment on a condition that the communication is in a predetermined format.

16. The cloud computing system of claim 11, wherein the server is further configured to receive input data from the client device and send one or more data communications to the client device.

17. The cloud computing system of claim 11, wherein the at least one processing task performed on behalf of the client device comprises a processing task for an Infrastructure as a Service (IaaS), a Software as a Service (SaaS), or a Platform as a Service (PaaS).

18. A method implemented in a host computer system, the method comprising:
implementing a workspace, wherein the workspace is configured to enable operation of a first set of one or more applications or processes via a first memory space;
implementing an isolated computing environment, the isolated computing environment using a host operating system and comprising a sandboxed computing environment using a second memory space to enable operation of a second set of one or more applications or processes, wherein the isolated computing environment is configured to access an Internet-based cloud service via at least one application of the second set of one or more applications or processes;
isolating the isolated computing environment from the workspace using an internal isolation firewall;
authenticate the isolated computing environment with an authentication device; and
communicating with a proxy server to access the Internet-based cloud service to allow communication between the at least one application and the Internet-based cloud service when the isolated computing environment has been authenticated.

19. The method of claim 18, wherein the Internet-based cloud service comprises one or more of an Infrastructure as a Service (IaaS), a Software as a Service (SaaS), or a Platform as a Service (PaaS).

* * * * *